(12) United States Patent
Chen et al.

(10) Patent No.: US 12,535,440 B2
(45) Date of Patent: Jan. 27, 2026

(54) CHARACTERIZING EFFECTS OF $CO_2$ CHEMICAL REACTION WITH ROCK MINERALS DURING CARBON CAPTURE AND SEQUESTRATION

(71) Applicant: Halliburton Energy Services, Inc., Houston, TX (US)

(72) Inventors: Songhua Chen, Houston, TX (US); Gabriela Singer, Houston, TX (US); Wei Shao, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 989 days.

(21) Appl. No.: 17/695,292

(22) Filed: Mar. 15, 2022

(65) Prior Publication Data

US 2023/0152254 A1     May 18, 2023

Related U.S. Application Data

(60) Provisional application No. 63/279,834, filed on Nov. 16, 2021.

(51) Int. Cl.
*G01N 24/08* (2006.01)
*G01B 21/30* (2006.01)
(Continued)

(52) U.S. Cl.
CPC ........... *G01N 24/081* (2013.01); *G01B 21/30* (2013.01); *G01N 1/28* (2013.01); *G01N 33/24* (2013.01)

(58) Field of Classification Search
CPC ........ G01N 1/28; G01N 24/081; G01N 33/24; G01B 21/30
See application file for complete search history.

(56) References Cited

U.S. PATENT DOCUMENTS

| | | | |
|---|---|---|---|
| 6,040,696 A * | 3/2000 | Ramakrishnan ... | G01R 33/4625 324/303 |
| 11,371,827 B2 * | 6/2022 | Singer ............. | G01R 33/448 |

(Continued)

FOREIGN PATENT DOCUMENTS

WO     2020-251555     12/2020

OTHER PUBLICATIONS

Singer et al. "Effect of CO2 Chemical Reactions on Rock Pore Surface Morphology—A Laboratory Study" International Petroleum Technology Conference, IPTC-23997-MS (Year: 2024).*

(Continued)

*Primary Examiner* — John Fitzgerald
(74) *Attorney, Agent, or Firm* — John Wustenberg; C. Tumey Law Group PLLC

(57) ABSTRACT

A method for measuring a carbon capture and sequestration site. The method may comprise acquiring one or more core samples from a carbon capture and sequestration site, performing a nuclear magnetic resonance (NMR) measurement on the one or more core samples to form a first NMR measurement performing a surface roughness measurement on the one or more core samples to determine a $R_{s,before}$ wherein the $R_{s,before}$ is a surface roughness of the one or more core samples before the one or more core samples are aged in a cell, and determining at least one property of the one or more core samples from at least the first NMR measurement and the $R_{s,before}$.

20 Claims, 8 Drawing Sheets

(51) Int. Cl.
*G01N 1/28* (2006.01)
*G01N 33/24* (2006.01)

(56) References Cited

U.S. PATENT DOCUMENTS

| | | | | |
|---|---|---|---|---|
| 11,530,999 | B2* | 12/2022 | Singer | G01R 33/5604 |
| 2010/0299126 | A1 | 11/2010 | Chugunov et al. | |
| 2015/0345259 | A1 | 12/2015 | Wang et al. | |
| 2016/0238734 | A1 | 8/2016 | Valori et al. | |
| 2017/0241921 | A1 | 8/2017 | Chen et al. | |
| 2018/0120471 | A1 | 5/2018 | Chen et al. | |
| 2019/0017374 | A1* | 1/2019 | Misra | G01V 3/32 |
| 2021/0364668 | A1 | 11/2021 | Shao et al. | |
| 2021/0373106 | A1 | 12/2021 | Singer et al. | |
| 2021/0404789 | A1 | 12/2021 | Singer et al. | |
| 2023/0093917 | A1* | 3/2023 | Chen | G01R 33/448 |
| | | | | 324/309 |
| 2024/0167991 | A1* | 5/2024 | Sayed | G01N 33/004 |
| 2024/0394447 | A1* | 11/2024 | Alsinan | G06T 7/11 |

OTHER PUBLICATIONS

Park, Jinyoung; Baek, Kyoungbae; Lee, Minhee; Chung, Chul-Woo; Wang, Sookyun (2017). The Use of the Surface Roughness Value to Quantify the Extent of Supercritical CO2 Involved Geochemical Reaction at a CO2 Sequestration Site. Applied Sciences, 7(6), 572-.

K.J. Kubiak; M.C.T. Wilson; T.G. Mathia; Ph. Carval (2011). Wettability versus roughness of engineering surfaces. , 271(3-4), 523-528.

Wan, Jiamin; Kim, Yongman; Tokunaga, Tetsu K. (2014). Contact angle measurement ambiguity in supercritical CO2—water—mineral systems: Mica as an example. International Journal of Greenhouse Gas Control, 31(), 128-137.

European Patent Office Extended European Search Report for EP Application No. 22896261.9 dated Feb. 19, 2025. PDF file. 7 pages.

Pires, J.C.M. et al. "Recent Developments On Carbon Capture and Storage: An Overview." Chemical Engineering Research and Design Journal, vol. 89, Issue No. 9, Jan. 2011, pp. 1446-1460. PDF file. 15 pages.

International Search Report and Written Opinion for Application No. PCT/US2022/022157, dated Aug. 11, 2022.

Song et al. Changes in the microstructure of low-rank coal after supercritical CO2 and water treatment. Fuel. Jul. 4, 2020, vol. 279, pp. 118493(1)-118493(13).

* cited by examiner

CHARACTERIZING EFFECTS OF $CO_2$ CHEMICAL REACTION WITH ROCK MINERALS DURING CARBON CAPTURE AND SEQUESTRATION

BACKGROUND

Permanent storage of environment $CO_2$ in depleted petroleum reservoirs or aquafers is a viable means to reduce the greenhouse gas effect on global warming. $CO_2$ is chemically reactive with many types of minerals that are common to petroleum reservoirs and aquafers. Such chemical reaction occurs at the surface of pores and directly causes changes in surface roughness and surface area. The chemical reactions depend not only on the minerals, but also on many other factors such as pH of the pore liquid, temperature, pressure, and the concentration of $CO_2$. The chemical reaction process is dynamic as the dissolution and precipitation occur simultaneously until a dynamic equilibrium is reached. Therefore, the reaction occurs rapidly, typically days or weeks after the injection. On the other hand, it may also occur during long term $CO_2$ storage as the reservoir environment and storage security changes.

Changes in surface roughness and surface area may directly affect the $CO_2$ injection because surface roughness may affect wettability of the formation. Therefore, the relative permeability of the greenhouse gas, $CO_2$ adsorption, storage and long-term security of the storage and caprock deterioration may also be affected. If significant surface erosion occurs, the porosity may change as well, which has been reported. Additionally, dissolution and precipitation may change the pore structure and connectivity, causing capillary force and permeability change, which may affect the caprock's ability to prevent leakage. Therefore, quantifying $CO_2$ chemical reaction caused rock property change is very important for Carbon Capture and Sequestration (CCS) site selection, storage capacity and security assessment.

BRIEF DESCRIPTION OF THE DRAWINGS

These drawings illustrate certain aspects of some examples of the present disclosure and should not be used to limit or define the disclosure.

DETAILED DESCRIPTION

This disclosure details a method and system for using nuclear magnetic resonance (NMR) measurements and Brunauer-Emmett-Teller (BET) adsorption isothermal measurements to assess $CO_2$ chemical reactions with rock minerals from a carbon capture and sequestration (CCS) site in a brine solution. As BET or laser scanning confocal microscopy (LCSM) measurements may not be conducted in downhole monitoring, NMR based surface roughness is potentially the suitable method for $CO_2$ storage assessment.

Surface roughness may be measured with contact stylus tracing, laser reflectivity, stylus profilometer, atomic force microscopes, non-contact laser or white light stylus metrology, scanning electron microscopy and compressed air measurement methods, etc. Additionally, non-contract techniques, such as LSCM and white light interferometer also measure surface roughness. Non-contact measurements may not damage the surface, and therefore potentially may be more accurate.

The economical drawback of many surface roughness measurements is that they are very time consuming, and thus expensive if high resolution and multiple spots are required to assess. The technical drawback is that the accuracy of the surface roughness determination is highly dependent on the quality of the preparation of the surface, saw marks, grinding dust residuals, and other contamination on the surface can have detrimental effect on the quantification of surface roughness and surface area. Moreover, the representativeness of a few surfaces may be insufficient if the rock pore system is highly heterogeneous. To understand the effect of changes in rock properties due to $CO_2$ chemical reaction with rock minerals in reservoir scale, the local variation on a fine scale may not be as important as the collective effect of all the local variations. Therefore, a volumetric (i.e., bulk) based surface roughness and surface area assessment method is more desirable.

The commonly used methods to determine the surface area of a rock include image perimeter based specific surface area (SSA) and BET SSA measurement. The potency of chemical reaction of $CO_2$-rich brine with minerals on the pore surface depends on the types of rock minerals. Most rock formations contain more than one single mineral, and each may have a different strength for $CO_2$-brine chemical reactions. Therefore, not only does the geometric surface area based SSA or physisorption based SSA need to be considered, but reactive transporting factor also need to be considered in order to simulate/predict the migration and storage capacity of $CO_2$. Thus, the controlling factors affecting $CO_2$ migration and storage as the result of $CO_2$ geochemical reaction on the surface are governed by SSA, mineral content, surface roughness, and surface to pore volume ratio.

Figure 1:
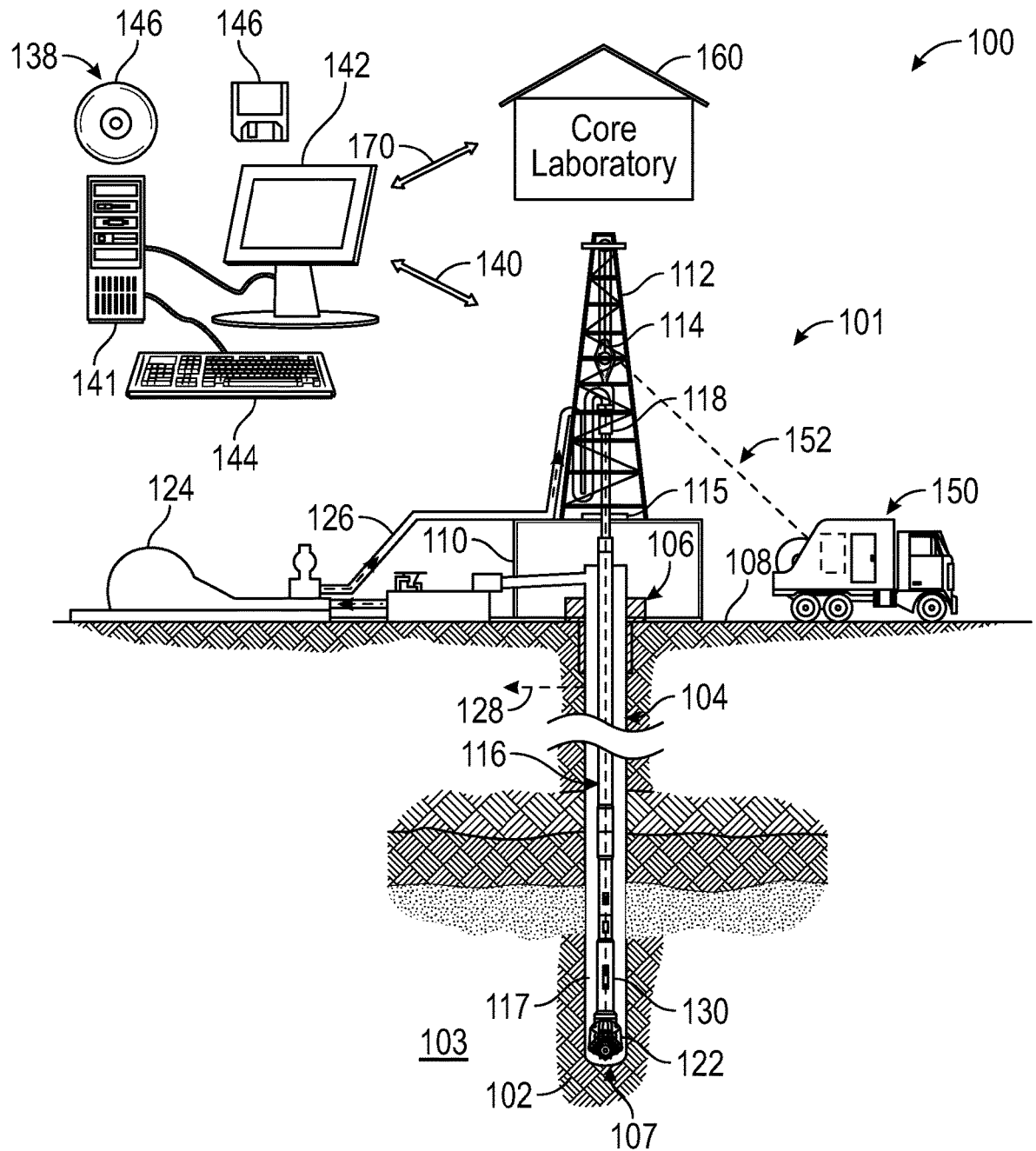
FIG. 1 illustrates an example of a core drilling operation.

As illustrated in FIG. 1, the geological subsurface domain may consist of multiple subterranean rock layers which, as a non-limiting example, may be classified and categorized by depositional age, depositional environment, or geologic properties to create one or more subterranean formations 100. In particular, one or more carbon capture and sequestration (CCS) sites 103 may exist as a subset of the subterranean formations 100, wherein the target subterranean formations 102 may have an interstitial pore space that contains at least hydrocarbons. CCS sites 103 may be depleted oil and gas reservoir or aquifers. An ideal CCS site 103 may be capable of adsorbing a large amount of $CO_2$ and keep it in place by not allowing the $CO_2$ to escape or migrate in time. After injection, the $CO_2$ will interact with the rock minerals, and it will change the pore system. The erosion by $CO_2$ to the storage formation and to the caprock could potentially cause $CO_2$ leakage. FIG. 1 further illustrates an example embodiment of a wellbore drilling system 101 which may be used to create a borehole 104 which fluidly couples target subterranean formation 102 to the surface 108. During downhole operations, wellbore drilling system 101 may perform operations for the cutting and collection of core samples wherein the execution of this operation may further include the cutting and collection of core samples. As illustrated, borehole 104 may extend from a wellhead 106 into a subterranean formation 102 from a surface 108. Generally, borehole 104 may include horizontal, vertical, slanted, curved, and other types of borehole geometries and orientations. Borehole 104 may be cased or uncased. In examples, borehole 104 may include a metallic member. By way of example, the metallic member may be a casing, liner, tubing, or other elongated steel tubular disposed in borehole 104.

Borehole 104 may extend through subterranean formations 100. As illustrated in FIG. 1, borehole 104 may extend generally vertically into subterranean formations 100, however borehole 104 may extend at an angle through subterranean formations 100, such as horizontal and slanted boreholes. For example, although FIG. 1 illustrates a vertical or low inclination angle well, high inclination angle or horizontal placement of the well and equipment may be possible. It should further be noted that while FIG. 1 generally depict land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A coring bit 122 may be attached to the distal end of drill string 116 and may be driven either by a downhole motor and/or via rotation of drill string 116 from surface 108. Without limitation, coring bit 122 may include, roller cone bits, PDC bits, natural diamond bits, any hole openers, reamers, coring bits, and the like. As coring bit 122 rotates, it may create and extend borehole 104 that penetrates various subterranean formations 100. Proximally disposed to coring bit 112 may be a bottom hole assembly (BHA) 117 which without limitation may comprise stabilizers, reamers, mud motors, logging while drilling (LWD) tools, measurement while drilling (MWD) or directional drilling tools, heavy-weight drill pipe, drilling collars, jars, coring tools, and underreaming tools. A pump 124 may circulate drilling fluid through a feed pipe 126 through kelly 118, downhole through interior of drill string 116, through orifices in coring bit 122, back to surface 108 via annulus 128 surrounding drill string 116, and into a retention pit (not shown).

With continued reference to FIG. 1, drill string 116 may begin at wellhead 106 and may traverse borehole 104. Coring bit 122 may be attached to a distal end of drill string 116 and may be driven, for example, either by a downhole motor and/or via rotation of drill string 116 from surface 108. Coring bit 122 and drill string 116 may be progressed through one or more subterranean formations 100 until target subterranean formation 102 is reached.

Drill string 116, coring bit 122, and BHA 117 may be removed from the well, through a process called "tripping out of hole," or a similar process. A coring bit 122 and coring BHA 117 are installed on drill string 116 which is then run back into borehole 104 through a process which may be called "tripping in hole," or a similar process. The face of coring bit 122 may consist of a toroidal cutting edge with a hollow center that extends full-bore through the body of coring bit 122. With coring bit 122 being the endmost piece of equipment in BHA 117, disposed proximally thereto is a core sample containment vessel which may be known as a core barrel 130. Once coring bit 122 is in contact with the bottom of the borehole 107 it is rotationally engaged with target subterranean formation 102 to cut and disengage a portion of target subterranean formation 102 in the form of a core. As coring bit 122 progresses further into target subterranean formation 102, the portion of the rock that is disengaged from target subterranean formation 102 is progressively encased in a core barrel 130 until the entirety of the core sample is disengaged from target subterranean formation 102 and encased within core barrel 130. In some embodiments the core sample is relayed from core barrel 130 to the rig floor 115 by removing drill string 116 from borehole 104. In non-limiting alternate embodiments, a wireline truck 150 and a wireline, electric line, braided cable, or slick line 152 may be used to relay core barrel 130 through the center of drill string 116 to rig floor 115. Additionally, BHA 117 may be comprise an NMR logging tool configured to obtain NMR measurements through standard implementation downhole logging operations.

As illustrated, communication link 140 (which may be wired or wireless, for example) may be provided that may transmit data during, such as NMR measurements, and instructions for coring operation from BHA 117 to an information handling system 138 at surface 108. Information handling system 138 may include a personal computer 141, a video display 142, a keyboard 144 (i.e., other input devices.), and/or non-transitory computer-readable media 146 (e.g., optical disks, magnetic disks) that may store code representative of the methods described herein. In addition to, or in place of processing at surface 108, processing may also occur downhole as information handling system 138 may be disposed on BHA 117. As discussed above, the software, algorithms, and modeling are performed by information handling system 138. Information handling system 138 may perform steps, run software, perform calculations, and/or the like automatically, through automation (such as through artificial intelligence ("AI"), dynamically, in real-time, and/or substantially in real-time.

Once retrieved from borehole 104, the at least one core may be packaged and transported to a core laboratory 160 where a multitude of tests may be performed to identify create a core sample data set which may be populated with geological and petrophysical features wherein some non-limiting examples include formation sedimentology, mineralogy, formation wettability, fluid saturations and distributions, formation factor, pore structure and pore volume, capillary pressure behavior, sediment grain density, horizontal and vertical permeability and relative permeabilities, porosity, and presence of diagenesis. Communication link 170 may be configured to transmit data during core analysis operations in core laboratory 160 to an information handling system 138. The data obtained during the petrophysical analysis in core laboratory 160 may be stored in a structured database or in an unstructured form on an information handling system 138 which may include a personal computer 141, a video display 142, a keyboard 144 (i.e., other input devices.), and/or non-transitory computer-readable media 146 (e.g., optical disks, magnetic disks) that may store code representative of the methods described herein. In addition to, or in place of processing at core laboratory 160, processing related to the collection of the core data set may also take place offsite from core laboratory 160. As discussed above, the software, algorithms, and modeling are performed by information handling system 138. Information handling system 138 may perform steps, run software, perform calculations, and/or the like automatically, through automation (such as through artificial intelligence ("AI"), dynamically, in real-time, and/or substantially in real-time.

Figure 2:
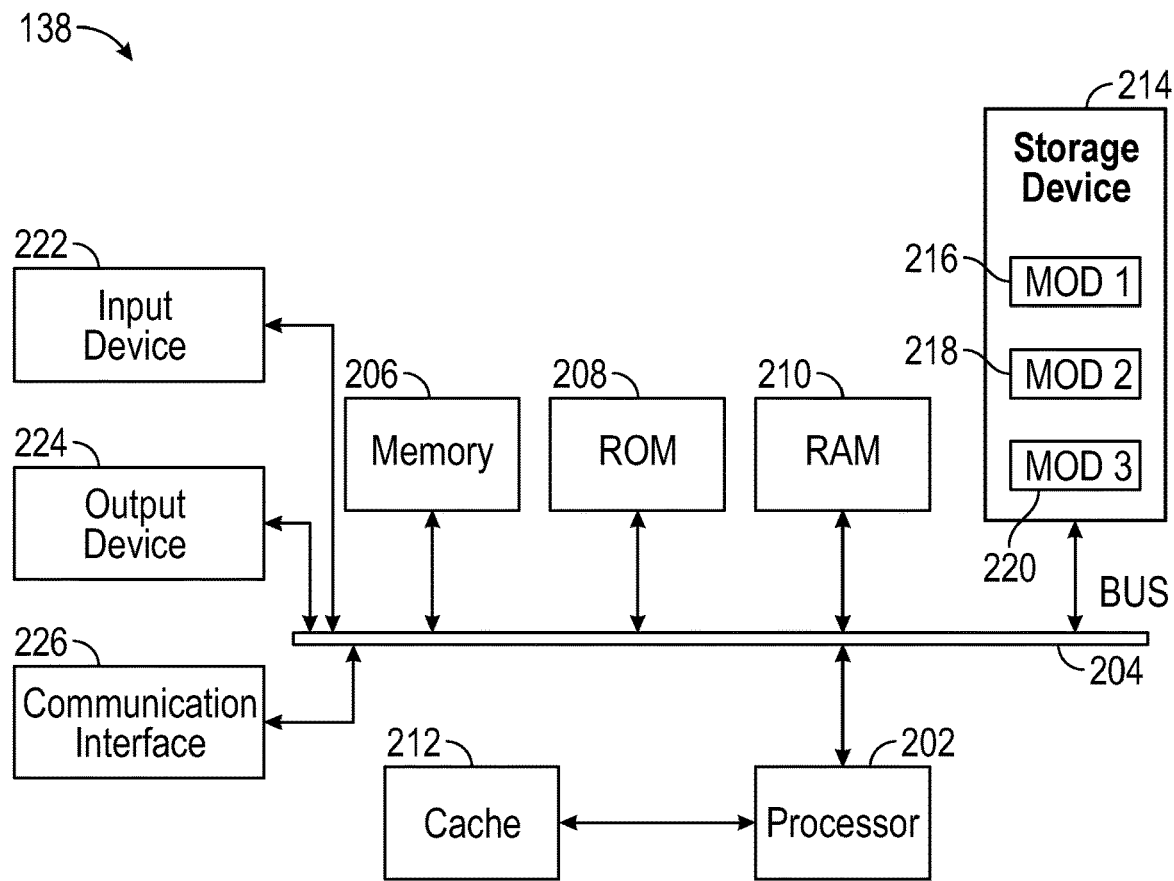
FIG. 2 illustrates a schematic view of an information handling system.

FIG. 2 illustrates an example information handling system 138 which may be employed to perform various steps, methods, and techniques disclosed herein. Persons of ordinary skill in the art will readily appreciate that other system examples are possible. As illustrated, information handling system 138 includes a processing unit (CPU or processor) 202 and a system bus 204 that couples various system components including system memory 206 such as read only memory (ROM) 208 and random-access memory (RAM) 210 to processor 202. Processors disclosed herein may all be forms of this processor 202. Information handling system 138 may include a cache 212 of high-speed memory connected directly with, in close proximity to, or integrated as part of processor 202. Information handling system 138 copies data from memory 206 and/or storage device 214 to cache 212 for quick access by processor 202. In this way, cache 212 provides a performance boost that avoids processor 202 delays while waiting for data. These and other modules may control or be configured to control processor 202 to perform various operations or actions. Other system memory 206 may be available for use as well. Memory 206 may include multiple different types of memory with different performance characteristics. It may be appreciated that the disclosure may operate on information handling system 138 with more than one processor 202 or on a group or cluster of computing devices networked together to provide greater processing capability. Processor 202 may include any general-purpose processor and a hardware module or software module, such as first module 216, second module 218, and third module 220 stored in storage device 214, configured to control processor 202 as well as a special-purpose processor where software instructions are incorporated into processor 202. Processor 202 may be a self-contained computing system, containing multiple cores or processors, a bus, memory controller, cache, etc. A multi-core processor may be symmetric or asymmetric. Processor 202 may include multiple processors, such as a system having multiple, physically separate processors in different sockets, or a system having multiple processor cores on a single physical chip. Similarly, processor 202 may include multiple distributed processors located in multiple separate computing devices but working together such as via a communications network. Multiple processors or processor cores may share resources such as memory 206 or cache 212 or may operate using independent resources. Processor 202 may include one or more state machines, an application specific integrated circuit (ASIC), or a programmable gate array (PGA) including a field PGA (FPGA).

Each individual component discussed above may be coupled to system bus 204, which may connect each and every individual component to each other. System bus 204 may be any of several types of bus structures including a memory bus or memory controller, a peripheral bus, and a local bus using any of a variety of bus architectures. A basic input/output (BIOS) stored in ROM 208 or the like, may provide the basic routine that helps to transfer information between elements within information handling system 138, such as during start-up. Information handling system 138 further includes storage devices 214 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 214 may include software modules 216, 218, and 220 for controlling processor 202. Information handling system 138 may include other hardware or software modules. Storage device 214 is connected to the system bus 204 by a drive interface. The drives and the associated computer-readable storage devices provide nonvolatile storage of computer-readable instructions, data structures, program modules and other data for information handling system 138. In one aspect, a hardware module that performs a particular function includes the software component stored in a tangible computer-readable storage device in connection with the necessary hardware components, such as processor 202, system bus 204, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 138 is a small, handheld computing device, a desktop computer, or a computer server. When processor 202 executes instructions to perform "operations", processor 202 may perform the operations directly and/or facilitate, direct, or cooperate with another device or component to perform the operations.

As illustrated, information handling system 138 employs storage device 214, which may be a hard disk or other types of computer-readable storage devices which may store data that are accessible by a computer, such as magnetic cassettes, flash memory cards, digital versatile disks (DVDs), cartridges, random access memories (RAMs) 210, read only memory (ROM) 208, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 138, an input device 222 represents any number of input mechanisms, such as a microphone for speech, a touch-sensitive screen for gesture or graphical input, keyboard, mouse, motion input, speech and so forth. Additionally, input device 222 may receive core samples or data derived from core samples obtained in core laboratory 160, discussed above. An output device 224 may also be one or more of a number of output mechanisms known to those of skill in the art. In some instances, multimodal systems enable a user to provide multiple types of input to communicate with information handling system 138. Communications interface 226 generally governs and manages the user input and system output. There is no restriction on operating on any particular hardware arrangement and therefore the basic hardware depicted may easily be substituted for improved hardware or firmware arrangements as they are developed.

As illustrated, each individual component describe above is depicted and disclosed as individual functional blocks. The functions these blocks represent may be provided through the use of either shared or dedicated hardware, including, but not limited to, hardware capable of executing software and hardware, such as a processor 202, that is purpose-built to operate as an equivalent to software executing on a general purpose processor. For example, the functions of one or more processors presented in FIG. 2 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 208 for storing software performing the operations described below, and random-access memory (RAM) 210 for storing results. Very large-scale integration (VLSI) hardware embodiments, as well as custom VLSI circuitry in combination with a general-purpose DSP circuit, may also be provided.

Figure 3:
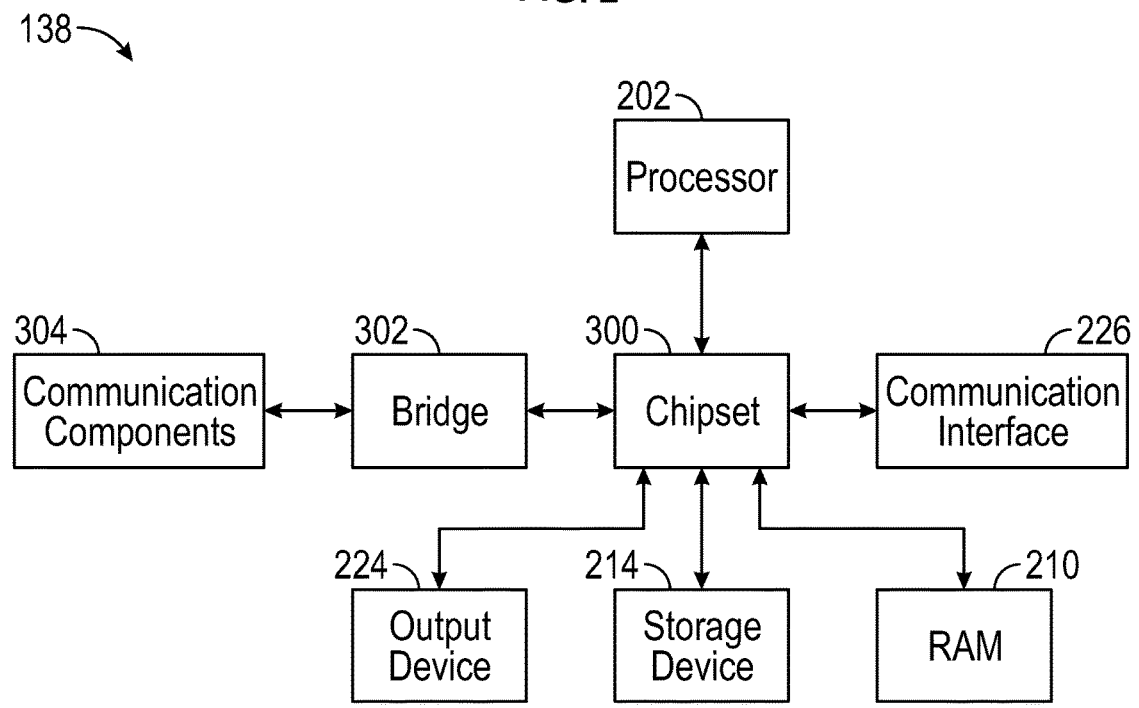
FIG. 3 illustrates is another schematic view of the information handling system.

FIG. 3 illustrates an example information handling system 138 having a chipset architecture that may be used in executing the described method and generating and displaying a graphical user interface (GUI). Information handling system 138 is an example of computer hardware, software, and firmware that may be used to implement the disclosed technology. Information handling system 138 may include a processor 202, representative of any number of physically and/or logically distinct resources capable of executing software, firmware, and hardware configured to perform identified computations. Processor 202 may communicate with a chipset 300 that may control input to and output from processor 202. In this example, chipset 300 outputs information to output device 224, such as a display, and may read and write information to storage device 214, which may include, for example, magnetic media, and solid-state media. Chipset 300 may also read data from and write data to RAM 210. A bridge 302 for interfacing with a variety of user interface components 304 may be provided for interfacing with chipset 300. Such user interface components 304 may include a keyboard, a microphone, touch detection and processing circuitry, a pointing device, such as a mouse, and so on. In general, inputs to information handling system 138 may come from any of a variety of sources, machine generated and/or human generated.

Chipset 300 may also interface with one or more communication interfaces 226 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 202 analyzing data stored in storage device 214 or RAM 210. Further, information handling system 138 receive inputs from a user via user interface components 304 and execute appropriate functions, such as browsing functions by interpreting these inputs using processor 202.

In examples, information handling system 138 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 4:
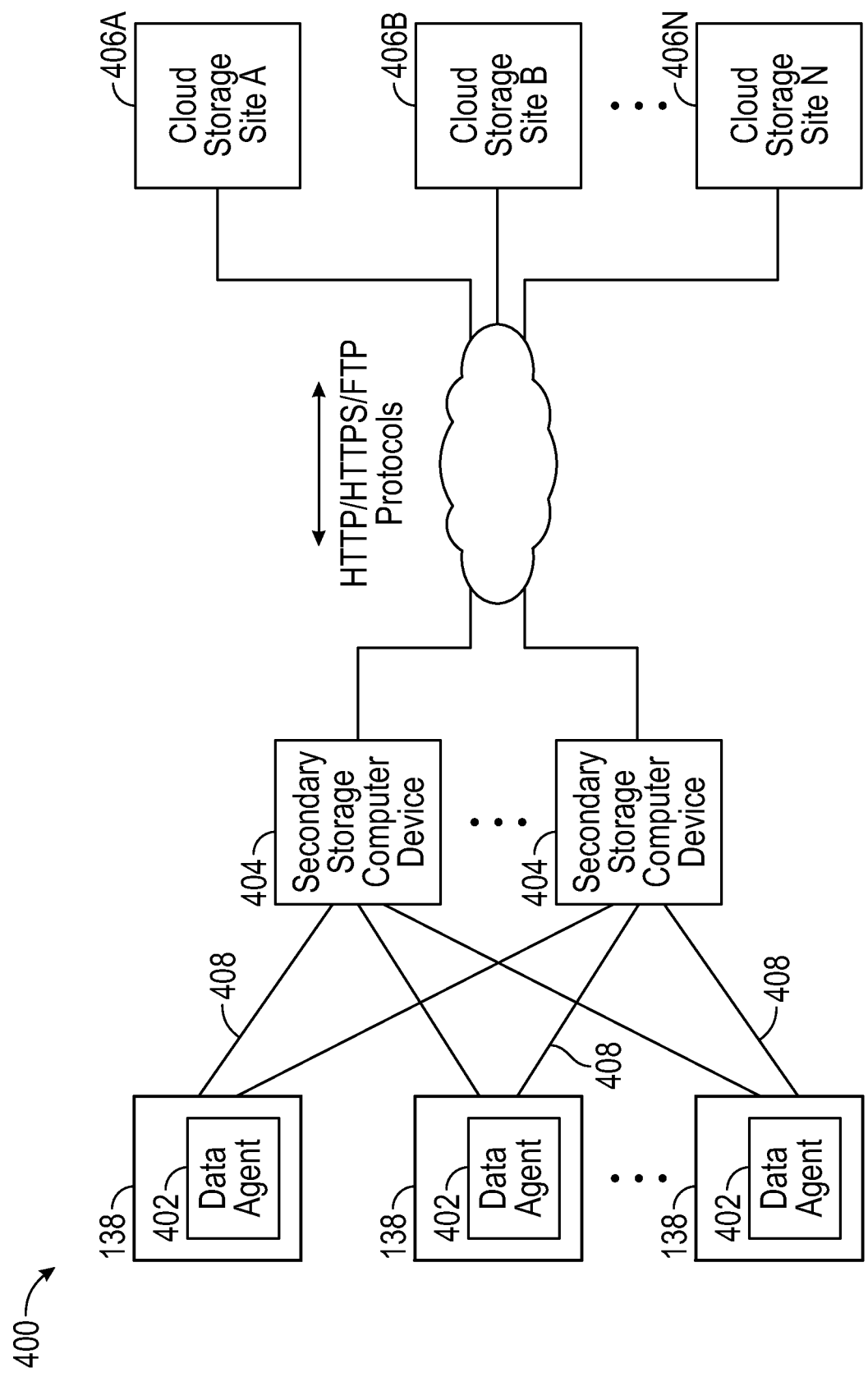
FIG. 4 illustrates an example of one arrangement of resources in a computing network that may employ the processes and techniques.

FIG. 4 illustrates an example of one arrangement of resources in a computing network 400 that may employ the processes and techniques described herein, although many others are of course possible. As noted above, an information handling system 138, as part of their function, may utilize data, which includes files, directories, metadata (e.g., access control list (ACLS) creation/edit dates associated with the data, etc.), and other data objects. The data on the information handling system 138 is typically a primary copy (e.g., a production copy). During a copy, backup, archive or other storage operation, information handling system 138 may send a copy of some data objects (or some components thereof) to a secondary storage computing device 404 by utilizing one or more data agents 402.

A data agent 402 may be a desktop application, website application, or any software-based application that is run on information handling system 138. As illustrated, information handling system 138 may be disposed at any rig site (e.g., referring to FIG. 1), off site location, core laboratory, repair and manufacturing center, and/or the like. In examples, data agent 402 may communicate with a secondary storage computing device 404 using communication protocol 408 in a wired or wireless system. Communication protocol 408 may function and operate as an input to a website application. In the website application, field data related to pre- and post-operations, generated DTCs, notes, and the like may be uploaded. Additionally, information handling system 138 may utilize communication protocol 408 to access processed measurements, operations with similar DTCs, troubleshooting findings, historical run data, and/or the like. This information is accessed from secondary storage computing device 404 by data agent 402, which is loaded on information handling system 138.

Secondary storage computing device 404 may operate and function to create secondary copies of primary data objects (or some components thereof) in various cloud storage sites 406A-N. Additionally, secondary storage computing device 404 may run determinative algorithms on data uploaded from one or more information handling systems 138, discussed further below. Communications between the secondary storage computing devices 404 and cloud storage sites 406A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 406A-N, the secondary storage computing device 404 may also perform local content indexing and/or local object-level, sub-object-level or block-level deduplication when performing storage operations involving various cloud storage sites 406A-N. Cloud storage sites 406A-N may further record and maintain, EM logs, map DTC codes, store repair and maintenance data, store operational data, and/or provide outputs from determinative algorithms that are located in cloud storage sites 406A-N. In a non-limiting example, this type of network may be utilized as a platform to store, backup, analyze, import, preform extract, transform and load ("ETL") processes, mathematically process, apply machine learning models, and augment EM measurement data sets.

A machine learning model may be an empirically derived model which may result from a machine learning algorithm identifying one or more underlying relationships within a dataset. In comparison to a physics-based model, such as Maxwell's Equations, which are derived from first principals and define the mathematical relationship of a system, a pure machine learning model may not be derived from first principals. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a necessary component of a dataset for certain algorithms, not all algorithms require a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may include evaluating model performance according to whether the model is over-fit or under-fit. As it may be assumed that all datasets contain some level of error, it may be important to evaluate and optimize the model performance and associated model fit by means of model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods include k-fold cross-validation, stratified k-fold cross-validation, bootstrapping, leave-one-out cross-validation, resubstituting, random sub-sampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions. Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated. Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may include the model error, wherein the optimal set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may include whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset includes both independent and corresponding dependent values where the dependent value may be thought of as "the answer," that the model is seeking to predict from the underlying relationships in the dataset. As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may include Neural Networks, K-Nearest Neighbors, Naïve Bayes, Decision Trees, Classification Trees, Regression Trees, Random Forests, Linear Regression, Support Vector Machines (SVM), Gradient Boosting Regression, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not include a dependent variable as the intended function of this type of algorithm is to identify one or more groupings or clusters within a dataset. In a non-limiting example, algorithms which may be utilized for unsupervised machine learning may include K-means clustering, K-means classification, Fuzzy C-Means, Gaussian Mixture, Hidden Markov Model, Neural Networks, and Hierarchical algorithms.

Figure 5:
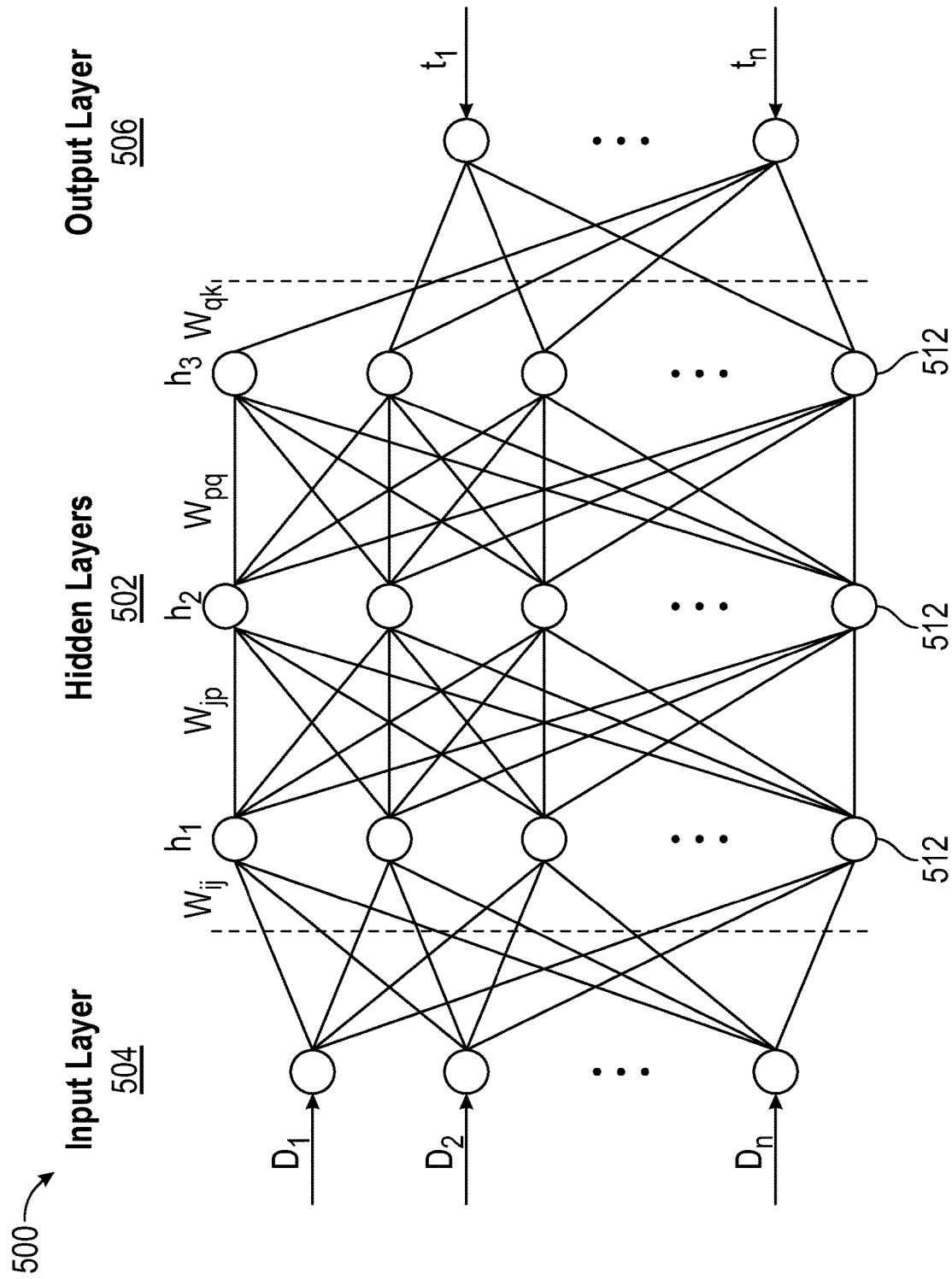
FIG. 5 illustrates an example of a neural network.

In examples to determine a relationship using machine learning, a neural network (NN) 500, as illustrated in FIG. 5, may be utilized to identify properties of CCS site 103 (e.g., referring to FIG. 1) and the effects to the properties of subterranean formation 102 when $CO_2$ is introduced into subterranean formation 102, as discussed below. A NN 500 is an artificial neural network with one or more hidden layers 502 between input layer 504 and output layer 506. As illustrated, input layer 504 may include all extracted measurements from core samples taken from CCS site 103, and output layers 506 may include pipe information from other sources. During operations, input data is taken by neurons 512 in first layer which then provide an output to the neurons 512 within next layer and so on which provides a final output in output layer 506. Each layer may have one or more neurons 512. The connection between two neurons 512 of successive layers may have an associated weight. The weight defines the influence of the input to the output for the next neuron 512 and eventually for the overall final output. The training process of NN 500 is to identify properties of subterranean formation 102 and the effects to the properties of subterranean formation 102 when $CO_2$ is introduced into subterranean formation 102, as discussed below. As be discussed in further detail below, workflows 600, 700, and 800 may be performed on NN 500, which is run on one or more information handling machines 138, as discussed in FIG. 4.

As noted above, core samples removed from subterranean formation 102, more specifically, a CCS site 103 may be transported to core laboratory 160 (e.g., referring to FIG. 1) for further lab analyses. Lab analyses may be performed on an information handling system 138 (e.g., referring to FIG. 1) and may include measurement, storing data, reviewing data, altering data, analyzing data, and/or the like. In examples, measurements may be utilized to determine porosity within a core sample as well as fluids that may be within the core sample through relaxation times. Such measurements are performed in the lab 160. As such, lab 160 may comprise NMR and LCSM equipment and capabilities to perform various NMR and LCSM measurements, herein referred to as NMR tool and surface roughness measuring tool. Additionally, LCSM measurements may be replaced with only stylus profilometer, atomic force microscopes, white light interferometer, or any combination of stylus profilometer, atomic force microscopes, white light interferometer with LCSM. Porosity, fluid identification, T2 NMR may also be done with the NMR logging tool. Nuclear magnetic resonance (NMR) relaxation time ($T_2$) of fluids (i.e., liquid and gas) in porous solids (such as formation rock) may be determined by multiple factors including surface relativity p, surface roughness factor $R_s$, characteristic pore size r, and the bulk fluid relaxation time $T_{2,b}$, which may be expressed as:

$$\frac{1}{T_2} = \frac{\rho R_s}{r} + \frac{1}{T_{2,b}} \quad (1)$$

where ρ is affected by the interfacial interactions of molecules between the mineral on the pore surface and the pore-filling fluid. In underground aquafer or petroleum reservoir rock formations, pore systems usually contain a distribution of pore sizes, therefore, the relaxation rate of each pore size, $r_k$, may be expressed in $$\left(\frac{1}{T_2}\right)_k = \frac{(\rho R_s)_k}{r_k} + \frac{1}{T_{2,b}} \quad (2)$$

For a rock with substantially uniform mineralogy, $\rho R_s$ may be considered the same for all pores, thus Equation (2) becomes:

$$\left(\frac{1}{T_2}\right)_k = \frac{\rho R_s}{r_k} + \frac{1}{T_{2,b}} \quad (3)$$

Rock formations contain a distribution of pore sizes, collectively, the gravimetric mean (log-mean) is given by:

$$\frac{1}{T_{2,GM}} = \frac{1}{T_{2S,LM}} + \frac{1}{T_{2,b}} \quad (4)$$

where surface component (assuming spherical pores) may be defined as:

$$\frac{1}{T_{2S,GM}} = \frac{3\rho_{DT2}}{r_{DT2}} = \frac{3\rho_{BET}}{r_{BET}} \quad (5)$$

where $\rho_{DT2}$, $r_{DT2}$, $\rho_{BET}$, and $r_{BET}$ are the surface relaxivities and average pore size measured from D-$T_2$ and BET, respectively.

Finding surface reflexivity using the BET method, $\rho_{BET}$, the specific surface area per unit weight of the core sample (cm²/g) $S_g$ is found as:

$$S_g = \frac{N_A A_{CS}}{M} \frac{W_m}{M_g} \tag{6}$$

where $N_A=6.02214129\times10^{23}$ mol$^{-1}$ is the Avogadro's number, the cross-sectional area of the adsorbate (0.162 nm² for $N_2$) $A_{CS}$, molecular weight of the adsorbate (14.0067 for $N_2$) $M_w$, the weight of adsorbate as monolayer $W_m$ and, and the core sample weight $M_g$ (g).

The surface area (S) per unit pore volume ($V_p$) ratio is then given by:

$$\frac{S}{V_p} = \frac{S}{V_g}\frac{1-\phi}{\phi} = \frac{1-\phi}{\phi}\rho_g S_g \tag{7}$$

where $\phi$ is the porosity of the core sample and $V_g$ and $\rho_g$ are volume (cc) and density of the solid grains (g/cc).

The BET surface area-based surface reflexivity may then be written as:

$$\rho_{BET} = \frac{1}{T_{2S,GM}}\frac{V_p}{S} = \frac{1}{T_{2S,GM}}\frac{\phi}{1-\phi}\frac{1}{\rho_g S_g} \tag{8}$$

The roughness parameter $R_s$ is defined as:

$$r_{DT2} = R_s r_{BET} \tag{9}$$

or equivalently:

$$\rho_{DT2} = R_s \rho_{BET} \tag{10}$$

From D-$T_2$ the roughness-free $r_{DT2}$ may be computed as:

$$\frac{s}{V_p} = \frac{1}{\rho_{DT} T_{2S,GM}} = \frac{3}{r_{DT2}} \tag{11}$$

or from CT we also measure the roughness-free $r_{CT}=r_{DT2}$.

To obtain $R_s$, both BET and D-$T_2$ measurements may be utilized, however the change in $R_s$ due to the $CO_2$ may be estimated from NMR, as shown below. Combining Eq. (5) and (9) the following is found:

$$\frac{1}{T_{2S,GM}} = R_s \frac{3\rho_{BET}}{r_{DT2}} \tag{12}$$

Defining the state before the $CO_2$ injection:

$$\left(\frac{1}{T_{2S,GM}}\right)_{before} = R_{s,before}\frac{3\rho_{BET}}{r_{DT}} \tag{13}$$

the changes that happen due to the presence of $CO_2$ in the formation may be found using:

$$\left(\frac{1}{T_{2S,GM}}\right)_{after} - \left(\frac{1}{T_{2S,GM}}\right)_{before} = \left(\frac{W}{S}R_{s,after} - R_{s,before}\right)\frac{3\rho_{BET}}{r_{DT2}} + \frac{1}{T'_{2b}} - \frac{1}{T_{2,b}} \tag{14}$$

where S and W are the saturation and wettability. Assuming $$T'_{2,b} = T_{2,b}$$

yields:

$$\Delta\left(\frac{1}{T_{2S,GM}}\right) = \left(\frac{W}{s}R_{s,after} - R_{s,before}\right)\frac{3\rho_{BET}}{r_{DT2}} \tag{15}$$

Using equation for before state, Eq. (13), Eq. (15) yields: and rearranging gives:

$$\Delta\left(\frac{1}{T_{2S,GM}}\right) = \left(\frac{W}{s}\frac{R_{s,after}}{R_{s,before}} - 1\right)\left(\frac{1}{T_{2S,GM}}\right)_{before} \tag{16}$$

$$\frac{R_{s,after}}{R_{s,before}} = \frac{s}{W}\left[\Delta\left(\frac{1}{T_{2S,GM}}\right)\bigg/\left(\frac{1}{T_{2S,GM}}\right)_{before} + 1\right] \tag{17}$$

from which the ratio $R_{s,after}/R_{s,before}$ may be determined if W and S are known, assuming W=S=1 gives simplification:

$$\frac{R_{s,after}}{R_{s,before}} = \Delta\left(\frac{1}{T_{2S,GM}}\right)\bigg/\left(\frac{1}{T_{2S,GM}}\right)_{before} + 1 \tag{18}$$

The above methods may be performed on information handling system 138 (e.g., referring to FIG. 1). These methods may be performed on a single information handling system 138 and/or multiple information handling systems 138 on a network (See FIG. 4). Additionally, methods may be performed using machine learning methods, discussed below (See also FIG. 5).

Figure 6:
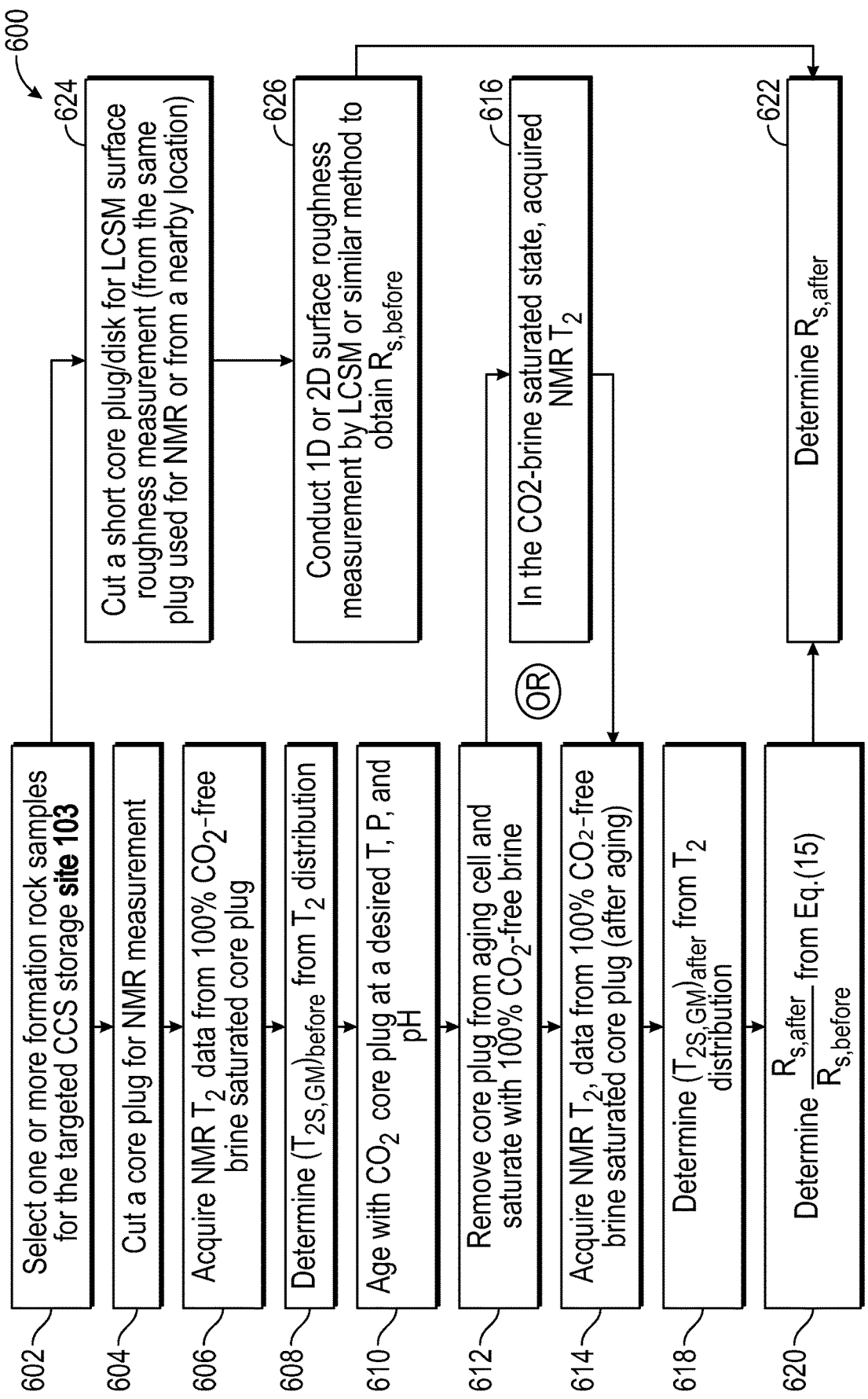
FIG. 6 is a workflow for determine effect of $CO_2$ on surface roughness $R_s$.

FIG. 6 illustrates a workflow 600 for determine effect of $CO_2$ on surface roughness $R_s$, also denoted as $R_{s,after}$ of CCS site 103 (e.g., referring to FIG. 1) performed in laboratory 160 and may be iterated for a plurality of core samples. Workflow 600 may begin with block 602. In block 602, one or more core samples may be selected from a CCS site 103. This core sample may be sent to a core laboratory 160 (e.g., referring to FIG. 1) for further analyses. In block 604, the core samples may be cut into a core plug for nuclear magnetic resonance (NMR) measurements. The core plug may be analyzed at core laboratory 160 for different properties. For example, in block 606 NMR $T_2$ distribution may be acquired from 100% $CO_2$ free brine saturated core plug. Herein, a 100% $CO_2$ free brine solution may be a solution which lacks $CO_2$ up to 90-100%. Thus, the 100% $CO_2$ free bine solution may be formed from not more than 10% $CO_2$. In block 608, $(T_{2S,GM})_{before}$ from the $T_2$ distribution is found (See Equation 13). Inundating may occur in block 610, where one or more core plugs may be placed in an aging cell and aged with $CO_2$ and regulated at a selected temperature T, pressure P, and pH. This may be accomplished in a controlled environment at a core laboratory 160. After inundating the one or more core plugs with $CO_2$, in block 612 the core plug may be removed from the aging cell and saturated with 100% $CO_2$ free brine. In block 614, NMR $T_2$ distribution may be acquired from the 100% $CO_2$ free brine saturated core plug (after aging in block 612). In examples, blocks 612 and 614 may be forgone for block 616, in which the $CO_2$ brine saturated state of the core plug, from block 610, may be analyzed to determine NMR $T_2$ distribution without inundating. After blocks 612 and 614, or in examples block 616, block 618 determines $(T_{2S,GM})_{after}$ from the $T_2$ distribution. The $T_2$ distribution from block 618 may be utilized in block 620 to determine $$\frac{R_{s,after}}{R_{s,before}}$$

using Equations 17 or 18, seen above.

Referring back to block 602, a secondary process is performed during the implementation of blocks 602-620. As illustrated, in block 624, a short core plug/disk may be cut from the core samples taken in block 602 or from CCS site 103. This short core plug/disk may be utilized for laser scanning confocal microscopy (LCSM) surface roughness measurement. In examples, LCSM may be performed with similar methods. Herein similar methods may be defined as only stylus profilometer, atomic force microscopes, white light interferometer, or any combination of stylus profilometer, atomic force microscopes, white light interferometer with LCSM or similar methods. It should be noted that the short core plug/disk may be from and/or near the core samples used in NMR measurements for blocks 604-620. In block 626, a 1D or 2D surface roughness measurement by LCSM or similar method may be performed to obtain $R_{s,before}$. As noted above, in block 622, $R_{s,after}$ may be determined using the information from block 620 and in conjunction with block 626. LSCM is an optical imaging technique that operates on the confocal principle, a spatial pinhole blocks the out of focus light. Multiple 2D images are captured at different depths in the core sample to reconstruct a 3D image. The maximum field of view is approximatively 1 mm×1 mm and depth of investigation of 1 mm or less, depending on the magnification. Because core samples are heterogeneous by nature, to ensure that the measurements are representative, several locations of the surface of the rock are measured, normally 5 symmetrical locations. An overall average number for the surface roughness is then calculated. LSCM may provide quantitative surface roughness value with an adequate field of view and surface resolution for core samples. However, other methods may be used to measure the surface roughness. For example, stylus profilometer, atomic force microscopy (AFM), and white light interferometry (WLI). $R_{s,before}$ is the roughness calculated from the LSCM or similar methods measurements acquired on the core sample before $CO_2$ exposure (or other methods for measuring the surface roughness, like the ones mentioned above, may be used). Additionally, a plurality of NMR measurement may be performed throughout workflow 600.

In examples, blocks 602, 610, 616, 618, and 620 may be performed downhole. AS such, NMR measurement may be performed on NMR logging tool, instead of within laboratory 160. First, $T_2$ NMR would be measured before the $CO_2$ injection to determine $T_{2S,GM,before}$. Subsequently, $CO_2$ is injected and $T_2$NMR is measured again to determine $T_{2S,GM,after}$, from which $R_{s,after}/R_{s,before}$, block 620, is measured with Equations (18) or (17).

Figure 7:
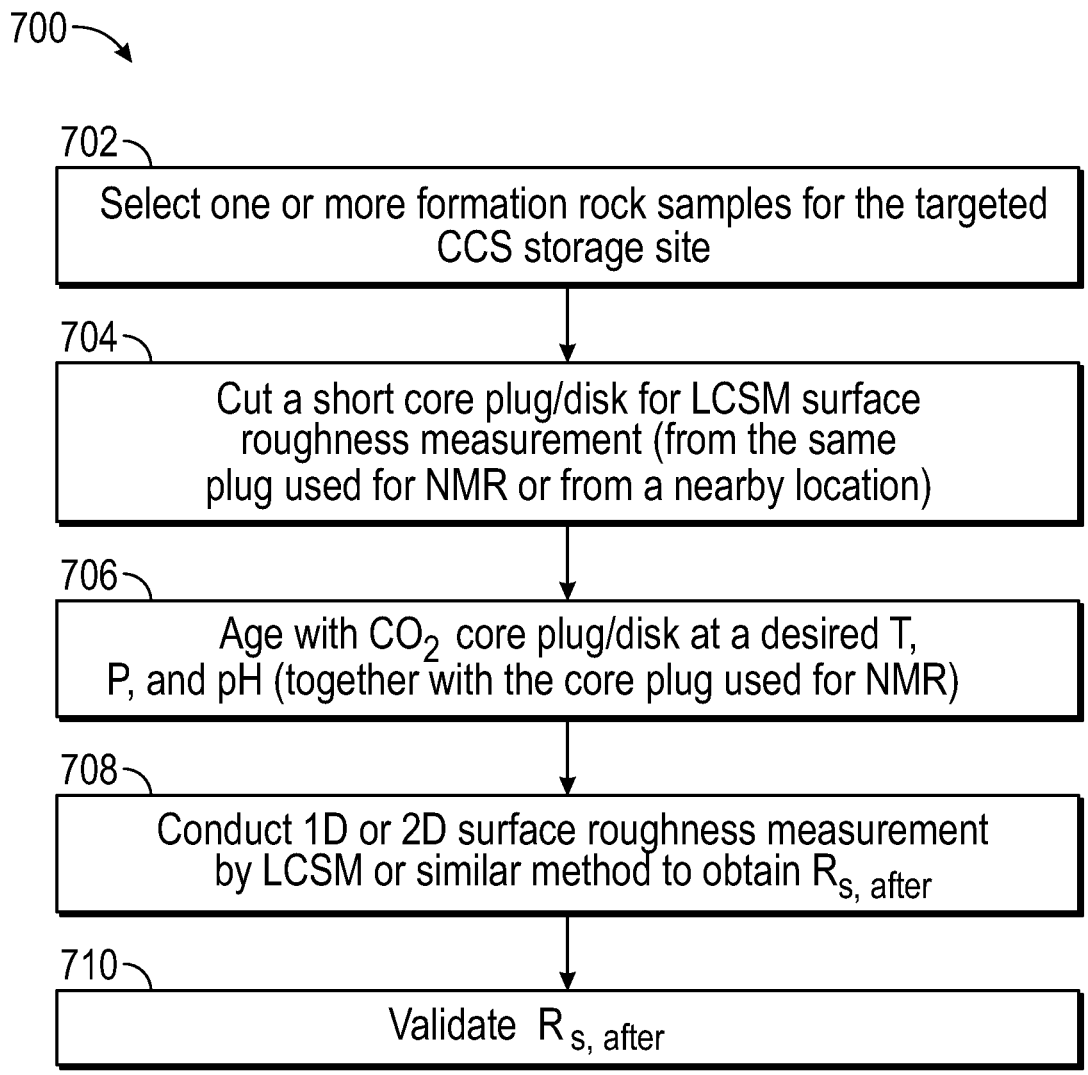
FIG. 7 is another example of the workflow in FIG. 6.

As noted above, the $CO_2$ effect on the surface roughness may be quantified by the ratio $R_{s,after}/R_{s,before}$ or, $R_{s,after}$ may be obtained by knowing/measuring $R_{s,before}$, the surface roughness before $CO_2$ exposure. Using the information obtained in workflow 600 such as $R_{s,before}$, workflow 700 may be applied to determine $R_{s,after}$. Workflow 700 may be performed multiple times, with varying temperature, pressure, mineral rock type, and pH environment in the rock, to establish a database of the surface roughness. Workflow 700 may begin with block 702 in which one or more core samples may be selected from a targeted CCS site 103 (e.g., referring to FIG. 1). This core sample may be sent to a core laboratory 160 (e.g., referring to FIG. 1) for further analyses. In block 704, a short core plug/disk may be cut from the core samples taken in block 702. This short core plug/disk may be utilized for LCSM stylus profilometer, atomic force microscopes, white light interferometer surface roughness measurement. It should be noted that the short core plug/disk may be from and/or near the core samples used in NMR measurements. In block 706, the short core plug/disk may be disposed in an aging cell and aged with $CO_2$ at a desired T, P, and pH. This may be accomplished in a controlled environment at a core laboratory 160. In block 708, a 1D or 2D surface roughness measurement by LCSM or similar methods may be performed to obtain $R_{s,after}$, as previously described $R_{s,after}$ may be validated in block 710 by measuring surface roughness after the $CO_2$ exposure, as shown in workflow 700 of FIG. 7, and compared to the value obtained from workflow 600 in FIG. 6.

In workflows 600 and 700 the saturation, S, and wettability W, may be assumed to stay the same before and after $CO_2$ injection and are equal to 1. However, in some situations, this might not be the case. In such examples, the saturation is easily determined from NMR, by using a calibration of the core sample with known porosity. The wettability is either assumed to be unchanged or it may be determined using known methods.

Figure 8:
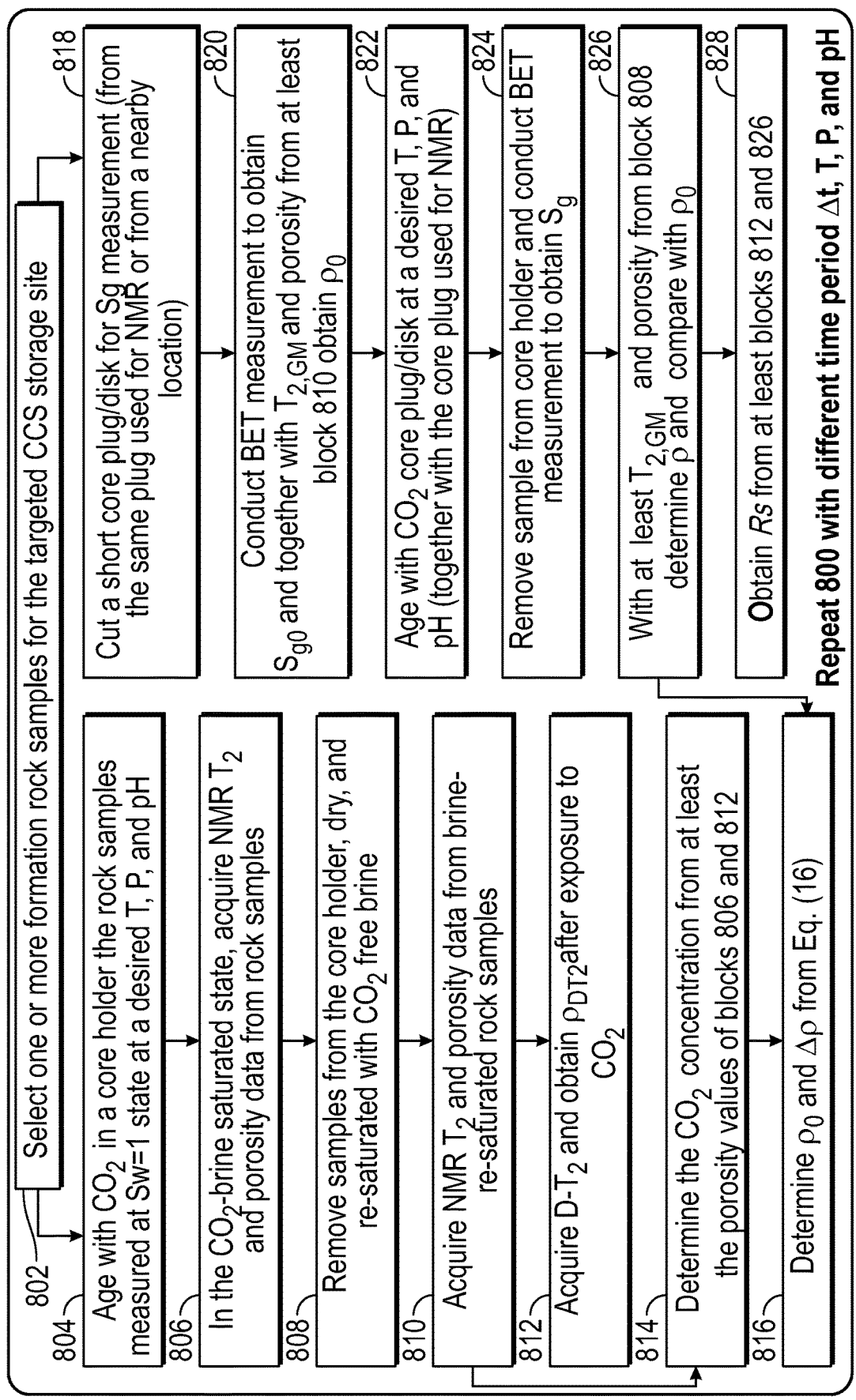
FIG. 8 is a workflow for determining Rs and the calibration of $\rho$.

FIG. 8 illustrates workflow 800 for determining Rs, defined as in $R_{s,after}$ in workflow 800 and the calibration of $\rho$ for a CCS site 103. To be discussed below, workflow 800 may allow $\rho$ to vary between a purely brine saturated rock, and for the same rock after $CO_2$ is injected and stored for a time chosen by personnel. Workflow 800 may take into consideration that a certain temperature, a certain pressure, a certain pH environment, and a certain $CO_2$ concentration in brine may cause the dissolved mineral and re-precipitated minerals and may be iterated for a plurality of core samples. Thus, none of the values are identical. This may happen if certain ions in the pore fluid that formed a new mineral which is subsequently crystalized to form a different mineral, although this is not expected to occur in large quantity. Workflow 800 may address such scenario, which may cause $\rho$ being different from $\rho_0$. In such case:

$$\rho = f(\rho_0, C, P, T, \Delta t) \tag{19}$$

where $f$ stands for "a function of", $\rho_0$ and $\rho$ are the surface relaxivities corresponding to $CO_2$-free brine saturated rock formation initially, and $\rho$ being the surface relativity corresponding to after time $\Delta t$ after a $CO_2$ concentration C being injected in the formation at given pressure P and temperature T, respectively. The concentration of $CO_2$ in the formation rock may also be dependent on pressure and temperature. This concentration dependent function $f$ may be estimated by doing the same $T_2$ measurements in a rock mineral with different $CO_2$ concentration aged for a specified time period $\Delta t$. Such calibration may only be performed once for every rock type as a calibration process. This is because the variations in calibration may be subtle, thus a linear approximation can often be obtained:

$$\rho = \rho_0 + \Delta\rho * C \tag{20}$$

Thus, the calibration process is to determine $\rho_0$ from the $CO_2$-free case and the slope $\Delta\rho$ from at least one additional measurement of non-zero C case.

FIG. 8 illustrates workflow 800, which is the process described above for determining $R_s$ and the calibration of $\rho$. Workflow 800 may begin with block 802. In block 802, one or more core samples may be selected from a targeted Carbon Capture and Sequestration (CCS) site 103. This core sample may be sent to a core laboratory 160 (e.g., referring to FIG. 1) for further analyses. In block 804, the core samples may be placed in a core holder, at core laboratory 160, and aged with $CO_2$ to measure at Sw=1 state a selected temperature T, pressure P, and pH. The core holder is designed such that it can hold the core sample and its material and size is such that it can fit in the NMR instrument and NMR measurements can be takes with the core sample inside the core holder. In block 806, the core samples may be saturated in a $CO_2$ free brine within the core holder for a designated amount of time. Next, NMR $T_2$ and porosity data may be collected from core samples. Additionally, porosity may be measured from other type of measurements.

In block 808, the rock samples are removed form the core holder, dried, and then re-saturated with $CO_2$ free brine. Next, in block 810, NMR $T_2$ and porosity data may be quired from the core samples. Further, in block 812, diffusion–T2 relaxation map D-$T_2$ and $\rho_{DT2}$ may be acquired after exposure to $CO_2$. D-$T_2$ may be acquired in laboratory 160 with standard implementation and $\rho_{DT2}$ is determined from the D-$T_2$ measurement. Using the porosity values of blocks 806 to 812, the $CO_2$ concentration may be determined. In block 806, $CO_2$ concentration is determined by the difference between the porosity measurements from blocks 806 and 810. Thus, in block 816, both po and OP may be determined utilizing Equation 19. It should be noted that both po and OP may be determined utilizing Equation 19 with variables found from blocks 804 to 814 as well as using variables from blocks 818 to 828. Additionally, determining OP may further comprise using a neural network or a Radial basis mapping function, described below.

For example, block 818 may start from block 802. In block 818, a short core plug/disk may be cut for $S_g$ measurements. Sg may be measured in laboratory 160 a physisorption analyzer, and the BET method is used to analyze the measured adsorption isotherm and calculate Sg, from Equation (6). The weight of adsorbate as monolayer is determined from the adsorption isotherm and the core sample weight is measured with a balance. The short core plug/disk may be used for NMR remeasured or other core samples from a neary location in the targeted Carbon Capture and Sequestration (CCS) site 103. In block 820, BET measurements may be performed on the short core plug/disk to obtain $S_{go}$, the specific surface area per unit weight of core sample area measured before exposure to $CO_2$. BET specific surface area measurements may be acquired in lab 160. In examples, a physisorption analyzer may used to measure gas adsorption isotherms and the BET method is used to calculate Sg using Equation (6). The weight of adsorbate as monolayer is determined from the adsorption isotherm and the core sample weight is measured with a balance. Together with $T_{2,GM}$ (See Equation 4) and porosity from block 810, po may be determined. In examples, $\rho$ may be determined in block 820, from Equation (8). $T_{2,GM}$ is from NMR, the porosity may be determined form NMR. In other examples, the gas measured porosity, the grain density is the dry weight divided by the grain volume and the specific surface area is determined from gas adsorption using the BET method.

In block 822 the short core plug/disk may be ages in an aging cell with $CO_2$ at a desired T, P, and pH. This aging may be performed in a core laboratory 160 (e.g., referring to FIG. 1). In block 824, the short core plug/disk may be removed from the aging cell and BET measurements may be conducted to obtain $S_g$, similar to as previously described in block 818. Similar to how po is obtained in block 820, $\rho$ is determined in block 826 from Equation (8) with $T_{2,GM}$ from the NMR $T_2$ distribution measured and porosity measured in 810. Additionally, in block 826, using $T_{2,GM}$ and porosity from block 806, $\rho$ is calculated with Equation (4) and compared with po. In block 828, $R_s$, surface roughness, may be determined using $\rho_{DT2}$ with block 812 and the following Equation:

$$R_s = \frac{1}{2}\left(\frac{\rho_{DT2}}{\rho_{BET}} - 1\right) \tag{21}$$

As previously stated, Workflow 800 may be repeated multiple times with different temperature, pressure, mineral rock type, and pH environment in the rock to establish a database of the surface roughness and surface area. Additionally, a plurality of NMR measurement may be performed throughout workflow 800.

Figure 9:
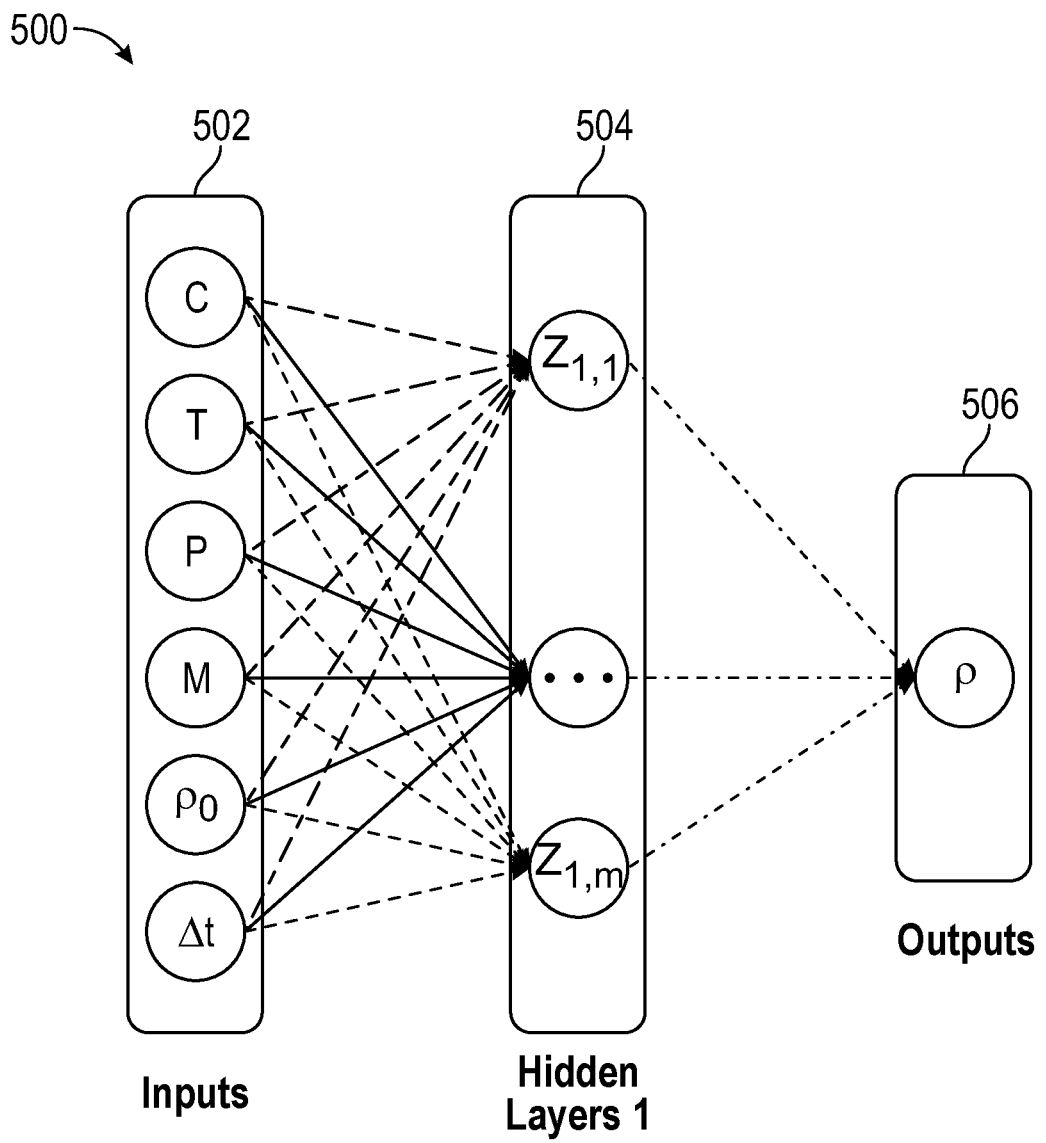
FIG. 9 is another example of the neural network.

In examples, it may be over burdensome and costly to conduct large experiment cases to establish databases using workflows 600, 700, or 800. Therefore, a data analytic approach, such as NN 500 in FIG. 5, may be used to fill all the variable space. Using NN 500, there may be two prediction targets. Target 1 may be a prediction of $\rho$ with variables C, T, P, mineral type, $\rho_0$, and $\Delta t$. Target 2 may be a prediction of correlation of $S_g$ with variables $R_s$ from NMR, C, T, P, mineral type, $\rho$, porosity, and $T_2$ distribution, and $\Delta t$ FIG. 9 illustrates a simplified version of NN 500. NN 500 may comprise a deep neural network with a plurality of hidden layers 504. In examples, hidden layers 504 may comprise only a single layer. Hidden layers 504 may be used to model the changes of $\rho$ between a purely brine saturated rock, and for the same rock after $CO_2$ is injected and stored with some time. For examples, inputs 502 may be a vector whose elements may be at least, concentration of $CO_2$ C, determined in block 814 (e.g. referring to FIG. 8), T selected in workflow 800, pressure P selected in workflow 800, mineralogy measurements M, $\rho_0$ determined in block 816, or aging time $\Delta t$. M may be one or more than mineralogy measurements, such as gamma elemental analysis data, spectral gamma ray data, natural gamma ray data. The mineralogy may be performed in laboratory 160 and may also be acquired downhole. In the laboratory, X-ray diffraction and Fourier Transform Infrared instrument are used to directly determine the mineralogy, and X-ray fluorescence spectroscopy is used to measure the elements from which the mineralogy is inferred. Downhole, the elements in the formation may be measured from a pulsed neutron generator, by elemental gamma capture spectroscopy, from a density log, which is a measurement of the bulk density of the formation using a gamma ray source. From natural gamma ray spectroscopy that measures the spectrum of gamma rays emitted naturally by the formation, from potassium, thorium and uranium.

Additionally, Δt may be the time that the core sample is left in $CO_2$ during any operation occurring at laboratory 160. In other examples, Δt may also be determined downhole the time that passed after the $CO_2$ injection. Hidden layers 504 may be utilized to compute the output 506 as ρ. Further, multiple inputs with determined ρ may be used to train hidden layers 504, as discussed in FIG. 5.

In examples, regression models in machine learning other than neural networks may also be used for prediction of ρ, such as random forest regression, support vector machines regression. In the case of the small database, a Radial basis function (RBF) model may be utilized to predict ρ. The RBF model may be used to approximate the underline physical system for ρ to certain degree of accuracy assuming the underlying physical system ρ is smooth and continuous regarding to the variables C, T, P, M, $ρ_0$, and Δt. RBF may utilize less data for training than other data analytic models, such as machine learning models. Furthermore, even if the training data for RBF is sparse or scatter, RBF can still approximate the underlying physical system very well.

RBF function $\vec{F}(\vec{z})$ is in the following form:

$$\vec{F}(\vec{x}) = \sum_{i=1}^{N} \vec{w}_i \varphi(\|\vec{\varphi}(\vec{x} - \vec{c}_i)\|) \quad (22)$$

where $\vec{w}_i$ is determined by the input-output data set $$\{(\vec{x}_i, \vec{y}_i)\}_{i=1}^{N}$$

in the database with the following constraints:

$$\vec{F}(\vec{x}_i) = \vec{y}_i, \; i=1,2,\ldots,N \quad (23)$$

and $$\{\vec{c}_i\}_{i=1}^{N}$$

are the centers of the RBF model. Usually, the centers are the input parameters.

To use RBF to predict ρ with variables C, T, P, mineral type, $ρ_0$, and Δt, the input variable $\vec{x}_i$ is as follows, $$\vec{x}_i = (C^i, T^i, P^i, \rho_0^i, \Delta t^i, M^i), i=1,2,\ldots,N \quad (24)$$

where $M^i$ is the ith mineralogy and lithology measurements, such as, gamma elemental analysis data, spectral gamma ray data, natural gamma ray data, density data, and/or neutron data. In the predicting process, $\vec{y}_i$ is the ρ of ith core sample in the database.

Prediction of correlation of $S_g$ with variables $R_s$ from NMR, C, T, P, mineral type, ρ, porosity, and $T_2$ distribution, and Δt may be found as discussed below.
Since:

$$\frac{1}{T_{2GM}} = \rho R_s \frac{s}{V_p} = \rho R_s \frac{s}{V_g} \frac{1-\phi}{\phi} = \rho R_s \frac{1-\phi}{\phi} \rho_g S_g \quad (25)$$

$$S_g = \frac{1}{T_{2GM}(\rho R_s)} \frac{\phi}{\rho_g(1-\phi)} \quad (26)$$

Hence,
The changes of $S_g$ is in the following form:

$$S_{g,after} - S_{g,before} = \frac{1}{T_{2GM,after}(\rho R_s)_{after}} \frac{\phi_{after}}{\rho_g(1-\phi_{after})} - \frac{1}{T_{2GM,before}(\rho R_s)_{before}} \frac{\phi_{before}}{\rho_g(1-\phi_{before})} \quad (27)$$

$T_{2GM,after}$, $T_{2GM,before}$, $\phi_{after}$ and $\phi_{before}$ may be determined with NMR logging measurements. Hence, Eq. (23) is rewritten as:

$$S_{g,after} - S_{g,before} = \frac{C_{nmr,after}}{(\rho R_s)_{after}} - \frac{C_{nmr,before}}{(\rho R_s)_{before}} \quad (28)$$

$C_{nmr,after}$ and $C_{nmr,before}$ are terms to be determined by NMR logging measurements. The relative changes of $S_g$ is in the following form:

$$\frac{S_{g,after} - S_{g,before}}{S_{g,before}} = \frac{C_{nmr,after}(\rho R_s)_{before}}{(\rho R_s)_{after}} - C_{nmr,before} = C_{nmr,after} \frac{(\rho)_{before}(R_s)_{before}}{(\rho)_{after}(R_s)_{after}} - C_{nm,before} \quad (29)$$

Additionally:

$$\frac{(\rho)_{before}}{(\rho)_{after}} \quad (30)$$

maybe determined by the machine learning models described in FIG. 9, $$\frac{(R_s)_{before}}{(R_s)_{after}}$$

may be determined Eq. (18). Thus, using Equations (21)-(26) Sg may be determined through logging measurements. The variable, Sg is an essential measurement for monitoring the rock change due to CO2 reaction with rock minerals.

Accordingly, the systems and methods of the present disclosure allow for a laboratory measurement method to assess and quantify the surface topology changes in core samples taken from a carbon capture and sequestration target formation. Specifically, measuring and identifying a specific surface area and surface roughness, as the result of erosion by $CO_2$ rich brine. Identifying surface property change may allow for the determination in how formation core samples, specifically rock properties, may change due to $CO_2$, which controls the series of subsequent changes in rock properties. Changes may allow for the identifying of dissolution and secondary precipitation of pores, porosity increase, and further causing pore connectivity and fluid transport changes that may allow for the simulation of $CO_2$ migration and plume processes and determining storage capacity and storage security in a carbon capture and sequestration target formation. As further discussed above, improvements over current technology may be found in NMR logging based methods that may allow monitoring the dynamic change of surface property and pore system as function of injection time or storage time. Such downhole, time lapse measurements may be used to adjust injection parameters, to update simulation model, thereby to improve the accuracy of storage capacity and security assessment. The systems and methods may include any of the various features disclosed herein, including one or more of the following statements.

Statement 1: The method may comprise acquiring one or more core samples from a carbon capture and sequestration (CCS) site, performing a nuclear magnetic resonance (NMR) measurement on the one or more core samples to form a first NMR measurement, performing a laser scanning confocal microscopy (LSCM) measurement on the one or more core samples to form a LSCM measurement, and determining a surface roughness from at least the first NMR measurement and the first LSCM measurement.

Statement 2. The method of statement 1, wherein the determining a surface roughness further comprises determining a $R_{s,before}$ with at least the first NMR measurement, wherein the $R_{s,before}$ is the surface roughness before the one or more core samples are aged in a cell.

Statement 3. The method of any previous statements 1 or 2, further comprising inundating the one or more core samples with $CO_2$ in a cell for a specified time.

Statement 4. The method of statement 3, further comprising inundating the one or more core samples with $CO_2$ in a cell for a specified time.

Statement 5. The method of statement 4, further comprising removing the one or more core samples from the cell and saturating the one or more core samples with a 100% $CO_2$ free brine solution to form one or more saturated core samples.

Statement 6. The method of statement 5, further comprising measuring the one or more saturated core samples to form a second NMR measurement or a third NMR measurement.

Statement 7. The method of any previous statements 4-6, further comprising removing the one or more core samples from the cell and performing NMR measurements on the one or more core samples to form at least a fourth NMR measurement and a fifth NMR measurement.

Statement 8. The method of any previous statements 3-7, further comprising determining a po with at least the first NMR measurement, wherein the po is a surface reflexivity before inundating the one or more core samples with $CO_2$.

Statement 9. The method of statement 8, further comprising determining a ρ with a function of the po, a concentration of $CO_2$, a pressure, a temperature, and the specified time, wherein the ρ is a surface reflexivity after inundating the one or more core samples with $CO_2$.

Statement 10. The method of statement 8, further comprising determining a ρ with a neural network or a radial basis function, wherein inputs to the neural network or the radial basis function are the po, a concentration of $CO_2$, a pressure, a temperature, and a specified time, wherein the ρ is surface reflexivity after inundating the one or more core samples with $CO_2$.

Statement 11. The method of any previous statements 8-10, wherein the first NMR measurement is obtained with the NMR logging tool.

Statement 12. The method of previous statements 10 or 11, further comprising determining a change in surface reflexivity, wherein the change in surface reflexivity is defined as a difference between the $\rho_0$ and the ρ.

Statement 13. A system for analyzing one or more core samples may comprise a nuclear magnetic resonance (NMR) tool for performing an NMR measurement on the one or more core samples to obtain a first NMR measurement, a laser scanning confocal microscopy (LCSM) tool for performing a LCSM measurement on the one or more core samples to obtain a first LSCM measurement, and an information handling system for determining a surface roughness from at least the first NMR measurement and the first LSCM measurement.

Statement 14. The method of statement 13, further comprising a cell for inundating the one or more core samples with $CO_2$ for a specified time.

Statement 15. The method of statement 13, wherein the cell is regulated at a desired pressure, a temperature, and a pH.

Statement 16. The method of statement 15, wherein the NMR tool performs measurements on the one or more core samples for a second NMR measurement or a third NMR measurement.

Statement 17. The method of previous statements 15 or 16, further comprising a core holder configured for saturating the one or more core samples with a 100% $CO_2$ free brine solution to form saturated one or more core samples.

Statement 18. The method of statement 17, wherein the NMR tool performs measurements on the one or more saturated core samples for a fourth NMR measurement or a fifth NMR measurement.

Statement 19. The method of any previous statements 14-18, wherein the information handling system further determines a $\rho_0$, wherein the po is surface reflexivity before inundating the one or more core samples with $CO_2$ with at least the first NMR measurement.

Statement 20. The method of statement 19, wherein the information handling system further determines a ρ with a function of the $\rho_0$, a concentration of $CO_2$, a pressure, a temperature, and the specified time or with a neural network or a radial basis function, wherein the ρ is surface reflexivity after inundating the one or more core samples with $CO_2$.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
  acquiring one or more core samples from a carbon capture and sequestration (CCS) site;
  performing a nuclear magnetic resonance (NMR) measurement on the one or more core samples to form a first NMR measurement;
  performing a surface roughness measurement on the one or more core samples to determine a $R_{s,before}$ wherein the $R_{s,before}$ is a surface roughness of the one or more core samples before the one or more core samples are aged in a cell; and
  determining at least one property of the one or more core samples from at least the first NMR measurement and the $R_{s,before}$.

2. The method of claim 1, wherein the surface roughness measurement is found using a laser scanning confocal microscopy, a stylus profilometer, atomic force microscopes, a white light interferometer, or any combination thereof.

3. The method of claim 1, further comprising inundating the one or more core samples with $CO_2$ in a cell for a specified time.

4. The method of claim 3, further comprising determining a po with at least the first NMR measurement, wherein the $\rho_0$ is a surface reflexivity before inundating the one or more core samples with $CO_2$.

5. The method of claim 4, further comprising determining a $\rho$ with a function of the $\rho_0$, a concentration of $CO_2$, a pressure, a temperature, and the specified time, wherein the $\rho$ is a surface reflexivity after inundating the one or more core samples with $CO_2$.

6. The method of claim 4, wherein the first NMR measurement is obtained with the NMR logging tool.

7. The method of claim 4, further comprising determining a $\rho$ with a neural network or a radial basis function, wherein inputs to the neural network or the radial basis function are the $\rho_0$, a concentration of $CO_2$, a pressure, a temperature, and a specified time, wherein the $\rho$ is surface reflexivity after inundating the one or more core samples with $CO_2$.

8. The method of claim 7, further comprising determining a change in surface reflexivity, wherein the change in surface reflexivity is defined as a difference between the $\rho_0$ and the $\rho$.

9. The method of claim 3, wherein the cell is regulated at a desired pressure, a temperature, and a pH.

10. The method of claim 9, further comprising removing the one or more core samples from the cell and performing NMR measurements on the one or more core samples to form at least a fourth NMR measurement and a fifth NMR measurement.

11. The method of claim 9, further comprising removing the one or more core samples from the cell and saturating the one or more core samples with a 100% $CO_2$ free brine solution to form one or more saturated core samples.

12. The method of claim 11, further comprising measuring the one or more saturated core samples to form a second NMR measurement or a third NMR measurement.

13. A system for analyzing one or more core samples from a carbon capture and sequestration (CCS) site comprising:
  a nuclear magnetic resonance (NMR) tool for performing an NMR measurement on the one or more core samples from the CCS site to obtain a first NMR measurement;
  a surface roughness measuring tool for performing a surface roughness measurement on the one or more core samples from the CCS site to determine a $R_{s,before}$ wherein the $R_{s,before}$ is a surface roughness of the one or more core samples before the one or more core samples are aged in a cell; and
  an information handling system for determining at least one property of the one or more core samples from at least the first NMR measurement and the $R_{s,before}$.

14. The system of claim 13, further comprising a cell for inundating the one or more core samples with $CO_2$ for a specified time.

15. The system of claim 14, wherein the information handling system further determines $\rho_0$, wherein the $\rho_0$ is surface reflexivity before inundating the one or more core samples from the CCS site with $CO_2$ with at least the first NMR measurement.

16. The system of claim 15, wherein the information handling system further determines a $\rho$ with a function of the $\rho_0$, a concentration of $CO_2$ a pressure, a temperature, and the specified time or with a neural network or a radial basis function, wherein the $\rho$ is surface reflexivity after inundating the one or more core samples from the CCS site with $CO_2$.

17. The system of claim 14, wherein the cell is regulated at a desired pressure, a temperature, and a pH.

18. The system of claim 17, wherein the NMR tool performs measurements on the one or more core samples from the CCS site for a second NMR measurement or a third NMR measurement.

19. The system of claim 17, further comprising a core holder configured for saturating the one or more core samples from the CCS site with a 100% $CO_2$ free brine solution to form saturated one or more core samples.

20. The system of claim 19, wherein the NMR tool performs measurements on the one or more saturated core samples for a fourth NMR measurement or a fifth NMR measurement.

* * * * *